United States Patent [19]
Childers

[11] 3,884,575
[45] May 20, 1975

[54] PROCESS CAMERA MONOTORING APPARATUS

[75] Inventor: Warren Childers, Houston, Tex.

[73] Assignee: Graphic Arts Mfg. Co., Inc., Houston, Tex.

[22] Filed: Jan. 29, 1973

[21] Appl. No.: 327,828

[52] U.S. Cl. ................................................ 355/68
[51] Int. Cl. .......................................... G03b 27/27
[58] Field of Search .............................. 355/68, 70

[56] References Cited
UNITED STATES PATENTS
2,593,216   4/1952   Sussin .................................. 355/68

Primary Examiner—John M. Horan
Attorney, Agent, or Firm—Donald Gunn

[57] ABSTRACT

An apparatus which monitors a process camera which has a lamp or light source therein for making a flash exposure on a sensitive medium wherein the apparatus incorporates a mechanical connection adapted to extend from the apparatus to the process camera, movable with the bellows of the camera. The apparatus incorporates a light source and a light sensitive device which are movable with respect to one another in response to the position of the process camera bellows. In the preferred embodiment, the position of the camera is determined by means of a string and pulley arrangement which adjusts the position of the light source and light sensitive device. All of the equipment is enclosed in a light-proof housing.

9 Claims, 3 Drawing Figures

PATENTED MAY 20 1975 3,884,575
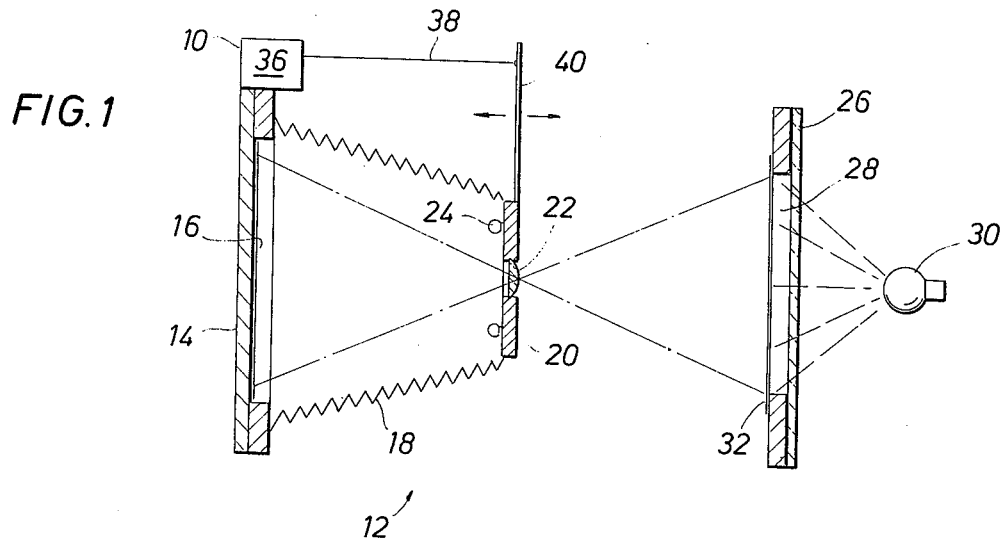
FIG.1
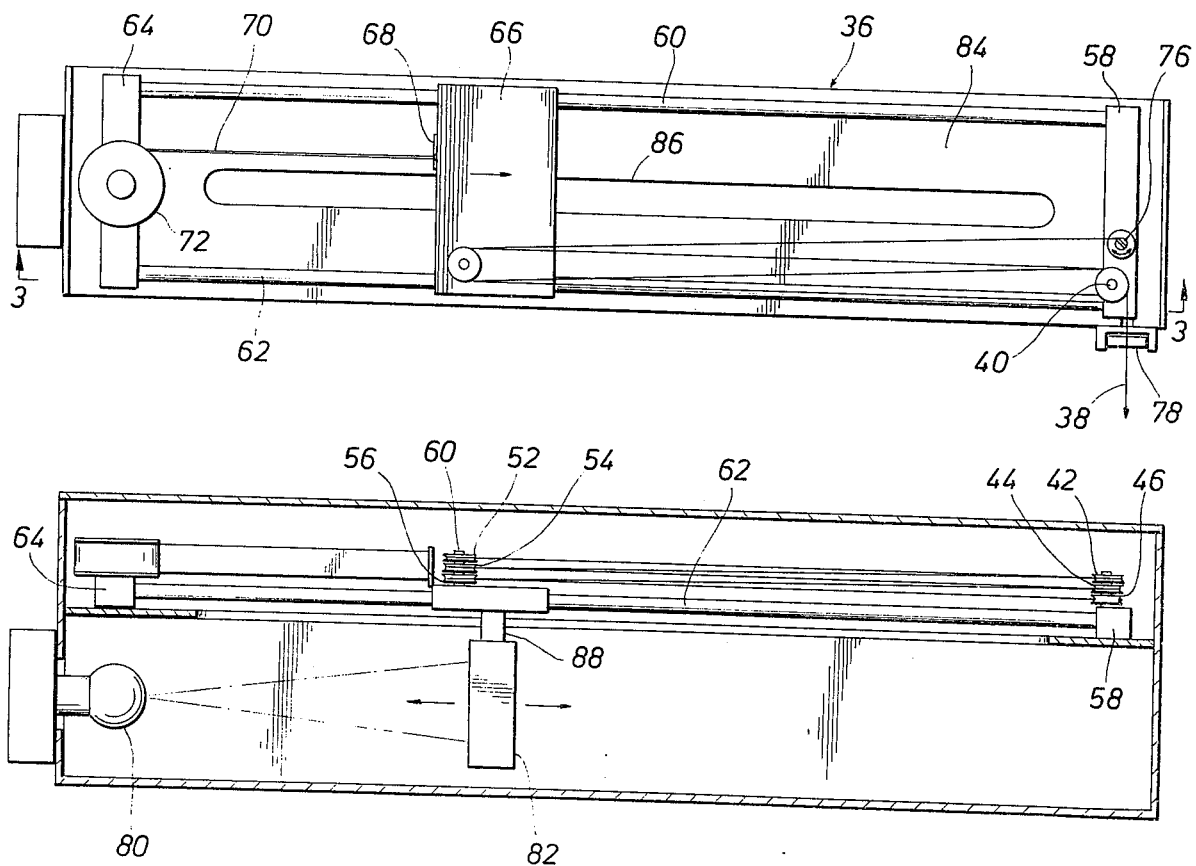
FIG.2
FIG.3

PROCESS CAMERA MONOTORING APPARATUS

BACKGROUND OF THE INVENTION

In the photographic industry, a process camera is quite often used to prepare color separations. Process cameras are to be distinguished from other cameras in that they are large, stationary cameras capable of preparing positives or negatives of substantial size. The process camera normally includes a vacuum platen against which is held an image receptor, typically light sensitive material. A process camera normally includes a large system attached at the end of a collapsable bellows. The length of the bellows is adjusted to control the magnification ratio.

Process cameras have found substantial use in the photographic industry. They are ordinarily used in the preparation of negatives or positives. With the critical adjustment of exposure time and adjustment of light levels, the interplay of these factors sometimes requires that a flashing exposure be made before a main exposure. The main exposure is the exposure in which the image to be transferred, is, in fact, transferred to the image receptor. Quite often this is accomplished through a screen which converts the image from a continuous tone into a dot pattern which is used in most printing processes. The main exposure sometimes does not adequately expose portions of the image receptor in the shadow tones to overcome the chemical inertia of the image receptor. The inertia refers to the tendency of the image receptor to require a certain quantum of light energy (the integral of light with respect to time) to fall on it prior to changing the image receptor in the least. The image receptor provides no gradation of color (contrast) until a minimum quantity of light energy has fallen on a given point of the image receptor. If this factor is ignored, many of the shadow tones of an image source will be lost on the image receptor because the amount of light energy from the image source is inadequate in the shadow tone range to overcome the chemical inertia of the image receptor.

This problem has been overcome in the past through the use of what has been termed a "flashing exposure." A flashing exposure is intended to evenly expose the image receptor. It is made without the negative. The amount of flashing exposure is dependent on the amount of light to be placed on the image receptor at subsequent exposure for the shadow tones in the image source. As a consequence, the process camera has often been modified to place lamps in the camera. Of necessity the lamps are within the bellows of the camera, and are in a position to expose the image receptor which is carried on the platen at the back of the camera. However, the amount of light which actually falls on the image receptor in the camera is dependent on numerous factors. It is dependent on the time of exposure, the operative condition of the bulbs, line voltage or voltage applied to the bulbs, and spacing of the bulbs from the image receptor. All of these factors have a bearing on the exposure of the image receptor. Flashing exposures have been attempted in the past, but many of these factors have been assumed constant, and other simplifications have been made such that flashing exposures have been less than accurate.

SUMMARY OF THE INVENTION

The apparatus has been devised with the foregoing problems in view. The present invention is intended to accurately and correctly monitor the light level within the process camera.

The present invention incorporates a closed light-proof box which contains a light source and light sensitive device. The two are adjusted in relative position with respect to one another by means of a mechanical system adapted to be connected with the front of the process camera. The front ordinarily carries the lens system and flashing lamps which are inside the camera. The closed light container is adapted to be placed about perpendicular with the plane of the platen. A string and pulley system is used to connect from the front of the camera to the closed container to adjust the relative position of the two components.

DESCRIPTION OF THE DRAWINGS

FIG. 1 is a schematic view showing the apparatus of the present invention installed with a process camera and positioning the process camera relative to an image source, an image receptor, and lamps for flashing exposure;

FIG. 2 is a sectional view through the structure of the present invention illustrating a string and pulley arrangement whereby the position of a lamp and light sensitive device is adjusted; and, FIG. 3 is a sectional view taken along the line 3—3 of FIG. 2 illustrating details of construction of the string and pulley system.

DESCRIPTION OF THE PREFERRED EMBODIMENTS

Attention is first directed to FIG. 1 where the present invention 10 is installed on a process camera 12. The process camera includes a back platen 14 which is preferably perforated at a number of locations. The perforations communicate with a vacuum system which pulls an image receptor 16 flat against the platen. This maintains the image receptor 16 in a given plane. The process camera includes a set of bellows 18 which connect to a front 20 which supports a lens system 22 and lamps 24 which are on the inside of the bellows. The lamps 24 are used for flashing exposures. Preferably the lamps 24 are arranged symmetrically about the center axis of the camera. Two or four lamps are preferably used.

A second vacuum operated platen 26 includes a transparent portion 28 so that light from the lamp 30 can pass through. An image source 32 is drawn against the platen 26 and held in a plane parallel to the plane of the platen 14. The image source 32 may be a positive or negative. The apparatus will be described presuming that it is a negative, although clearly it can also be a positive.

The arrangement of FIG. 1 shows the equipment prepared for preparation of the main exposure wherein the lamp 30 illuminates the negative 32 and light from the negative 32 passes through the lens system and is directed to the image receptor 16. The apparatus can be used to form a flashing exposure, exposure of the image receptor 16, by illumination by the lamps 24.

The apparatus of the present invention is installed by attaching a sealed or light-proof box 36 to the platen 14. It is stationary with the process camera. A string 38 extends to an arm 40 which is fixed to the camera relative to the lamps 24. When the bellows 18 are extended or collapsed, the string 38 is pulled or retracted depending on the relative position of the lamps 24. The string 38 is used as an input to indicate relative position of the lamps 24 with respect to the image receptor 16.

Attention is next directed to FIG. 2 where the string 38 is shown extending into the light-proof container 36. A mounting post 40 supports three pulleys 42, 44 and 46. The three pulleys are mounted on the post 40 and rotate independently of one another. A second mounting post 50 supports pulleys 52, 54 and 56.

A transversely extending fixed brace 58 spans the apparatus at one end immediately adjacent to the point of entry of the string 38. The brace 58 supports the mounting post 40 for the pulleys. The transversely extending brace 58 extends from wall to wall of the apparatus. It supports a pair of guide bars 60 and 62 which extend the full length of the apparatus to a similar brace 64 at the opposite end. The guide bars 60 and 62 are preferably parallel to one another and serve as a guide or track for a movable carriage 66. The carriage 66 is preferably a rectangular member of sufficient width to extend between the guide bars. It is drilled with a pair of parallel holes to permit the carriage 66 to be positioned on the guide bars 60 and 62. The carriage 66 slides on the guide bars. Bearing surfaces can be incorporated as desired by lining the passages drilled in the carriage 66 with Teflon or other slick surface material.

The carriage 66 incorporates an upstanding bracket 68 which is adapted to be connected with a spring member 70 which coils within a drum 72. The mechanism serves as a return device drawing the carriage to the left as shown in FIGS. 2 and 3. The drum 72 is supported on the transverse mounting bracket 64 and reels in or out the flexible member 70. As the carriage moves to the right, the flexible member is withdrawn or stretched. The flexible member tends to draw the movable carriage 66 back to the left.

The carriage 66 supports the shaft 50 which supports three pulleys previously described. The string 38 enters the closed container 36 through a small opening. It then passes over one of the pulleys at the right hand end and extends back and forth between the three sets of three pulleys to traverse the length of the equipment. The string traverses the equipment six times, ending at a tie off post 76. The post 76 is preferably friction mounted and rotated by the use of a screw driver slot in its end face. The string is wrapped around the post three or four times to enable minute adjustments in the string or cable at the time of installation. The preferred material for the string is small diameter aircraft type cable shich is readily wrapped about the post and through the pulleys. The adjustment herein described is best used to compensate for lamp and photo-diode geometry and for reciprocity failure of the sensitized material. The adjustment of the cable is aided by placing a bead or marker on the cable as a reference as shown in the drawings.

The tie off post 76 is fixed adjacent to the post 40. The end of the string is attached to it.

An external set of parallel rollers 78 are adjacent to the opening where the string 38 enters the container 36. The rollers serve as a guide for the string to prevent it from hanging on the edge of the small opening.

Attention is next directed to FIG. 3 where the light source 80 is preferably connected in parallel to the lamps 24 shown in FIG. 1. It is preferably of the same grade of equipment and connected in parallel to function simultaneously with the lamps 24.

A light sensitive device 82 is supported on the carriage 66. As shown in FIG. 3, it is below the carriage and movable directly toward or away from the lamp 80. The light sensitive device is preferably a photo diode or other similar device. It provides an output signal proportional to the light falling on it. The photo sensitive device measures the amount of light falling on it.

A divider wall 84 within the apparatus is adjacent to the guide rods 60 and 62. An elongate slot 86 is formed in the divider plate 84 and is of sufficient size to receive a mounting post 88 which extends from the carriage 66 to the photo cell 82 shown in FIG. 3. The divider plate 84 preferably defines a volume of space where the photo sensitive device 82 can move. The space is of sufficient size to permit the photo cell 82 to move without imposition of other apparatus between it and the light 80. The interior of the housing 36 is preferably painted black or coated with black velvet or other light absorbing material to prevent glare and reflection from being focused along the length of the box on the photo cell. This makes the photo cell accurately responsive to operation of the lamp 80.

In operation, the equipment functions in the following manner after installation. As the process camera 12 is adjusted, the string 38 is pulled to and fro. When the string is pulled, it moves the carriage 66. When the string is pulled out, the carriage 66 moves to and fro within the light-proof box 36. The rate of movement is geared down by virtue of the six loops of string engaged with the several pulleys. If desired, the number of pulleys and reduction ratio of the pulley system can be altered. The ratio of the pulley system gears the movement of the light sensitive device 82 to approximate the rate of change of light falling on the image receptor 16 from the lamps 24 shown in FIG. 1. This then permits the device 82 to form an output signal which is proportionate to the position of the lamps with respect to the photo diode 82. This relationship corresponds to the relationship obtained within the process camera.

The apparatus functions with the process camera to form a signal which can be used by apparatus disclosed in U.S. Pat. No. 3,545,858 to integrate as a function of time the actual light intensity falling on the film 16. This provides better and more accurate control of the flashing exposure of the film 16. This accurate control system can be used with light time integrators of the type described in the above mentioned patent to control the actual time of the exposure. It is desirable but not mandatory to use light bulbs of the same general make, age, and size as the bulbs 24 used in the process.

Other mechanical systems can be used for conveying the motion of the process camera and bulbs 24 to the apparatus. However, the apparatus described is economical and reliable.

The foregoing is directed to the preferred embodiment of the present invention. The scope thereof is determined by the claims which are appended hereto.

I claim:

1. Apparatus for monitoring light level within a process camera having a lamp for a flashing exposure, comprising:

a light sensitive device;

a light emitting device exposed to said light sensitive device; and, means connected to either said light sensitive device or said light emitting device and adapted to be connected to a process camera in a manner to vary the relative position of said light emitting device to said light sensitive device and which is adapted to control a flashing exposure for an image receptor in the process camera, said means altering the light falling on said light sensitive device.

2. The apparatus of claim 1 including a structure closing said light sensitive device to light from external sources.

3. The apparatus of claim 2 wherein said structure is a closed box having a clear volume between said light sensitive device and said light emitting device.

4. The apparatus of claim 1 including an elongate guide means arranged between said light emitting device and said light sensitive device; support means slidably on said guide means and supporting one of said light devices for movement toward or away from another.

5. The apparatus of claim 4 wherein said connecting means communicates movement of the process camera to said support means to move said support means along said guide means.

6. The apparatus of claim 1 wherein said connecting means includes
a flexible member adapted to be connected to a bellows of a process camera;
means for connecting said flexible member to one of said light emitting devices or said light sensitive device for moving said one device; and,
resilient means connected to said one device tending to oppose movement caused by said flexible member of said one device.

7. The apparatus of claim 6 wherein said flexible member passes over a plurality of pulleys, at least one of which is movable with said one device.

8. The apparatus of claim 6 wherein said flexible member extends through an opening in a structure surrounding said devices, said structure and said light sensitive device being so arranged that light entering said structure through the hole does not fall on said light sensitive device.

9. The apparatus of claim 6 wherein said resilient means includes
an elongate coil member;
a means for retracting and reeling said coil thereabout;
a movable support means connected to one end of said coil means, said means supporting said one device; and,
guide means cooperative with said support means to control movement of said one device toward the other said device.

* * * * *